(12) United States Patent
Fakrenkopf et al.

(10) Patent No.: US 8,897,438 B2
(45) Date of Patent: *Nov. 25, 2014

(54) MESSAGE FORWARDING BASED ON SENDER AND RECIPIENT RELATIONSHIP

(75) Inventors: Eckhard Fakrenkopf, Schriesheim (DE); Dirk Saager, Karlsruhe (DE); Andre Eichhorst, Ladenburg (DE); Tian Xu, Shanghai (CN)

(73) Assignee: SAP AG, Walldorf (DE)

( * ) Notice: Subject to any disclaimer, the term of this patent is extended or adjusted under 35 U.S.C. 154(b) by 336 days.

This patent is subject to a terminal disclaimer.

(21) Appl. No.: 13/244,001

(22) Filed: Sep. 23, 2011

(65) Prior Publication Data

US 2012/0076281 A1 Mar. 29, 2012

Related U.S. Application Data

(63) Continuation of application No. 11/635,865, filed on Dec. 6, 2006, now Pat. No. 8,050,396.

(51) Int. Cl.
| | | |
|---|---|---|
| *H04M 3/00* | (2006.01) | |
| *H04L 29/12* | (2006.01) | |
| *G06Q 10/10* | (2012.01) | |
| *H04M 3/51* | (2006.01) | |
| *H04L 29/08* | (2006.01) | |
| *H04M 3/523* | (2006.01) | |

(52) U.S. Cl.
CPC .......... *G06Q 10/107* (2013.01); *H04L 29/1216* (2013.01); *H04M 3/5183* (2013.01); *H04L 67/306* (2013.01); *H04M 3/5233* (2013.01); *H04L 61/157* (2013.01)
USPC ................................ 379/265.12; 379/265.13

(58) Field of Classification Search
USPC .......................................... 379/265.01–266.1
See application file for complete search history.

(56) References Cited

U.S. PATENT DOCUMENTS

| | | | | |
|---|---|---|---|---|
| 6,389,132 B1 * | 5/2002 | Price | ......................... | 379/265.01 |
| 7,027,584 B2 * | 4/2006 | Boehm | .................... | 379/265.09 |
| 7,184,540 B2 * | 2/2007 | Dezonno et al. | .......... | 379/265.02 |

* cited by examiner

*Primary Examiner* — Simon Sing
(74) *Attorney, Agent, or Firm* — Mintz Levin Cohn Ferris Glovsky and Popeo, P.C.

(57) ABSTRACT

Techniques for message forwarding based on a relationship between a sender and a recipient are described herein. In one embodiment, a process includes, but is not limited to, in response to a message from a sender over a network, identifying a list of candidate recipients to handle the message based on roles of the candidate recipients within an organization in view of the sender, and forwarding the message to a recipient selected from the list of the candidate recipient to enable the selected recipient to handle the message. Other methods and apparatuses are also described.

20 Claims, 12 Drawing Sheets

MESSAGE FORWARDING BASED ON SENDER AND RECIPIENT RELATIONSHIP

This application is a continuation application of U.S. patent application Ser. No. 11/635,865, filed on Dec. 6, 2006 now U.S. Pat. No. 8,050,396, and entitled "MESSAGE FORWARDING BASED ON SENDER AND RECIPIENT RELATIONSHIP," the contents of which are hereby incorporated by reference.

FIELD OF THE INVENTION

The present invention relates generally to data processing. More particularly, this invention relates to call forwarding based on sender and recipient relationship.

BACKGROUND

While a customer from one region gives a call to a call center by accessing a common telephone number (e.g. an 800 area code phone number), the call should be accepted by the dedicated service desk employee who is responsible for that region. Other people, who are not responsible for the service to the dedicated region, should not receive the call and see the attached data of the customer who is associated with the dedicated region. Conventional methods and systems have not effectively addressed these issues.

SUMMARY OF THE DESCRIPTION

Techniques for message (the message can be a call or any communication request as well as it's related context) forwarding based on a relationship between a sender and a recipient are described herein. In one embodiment, a process includes, but is not limited to, in response to a message from a sender over a network, identifying a list of candidate recipients to handle the message based on roles of the candidate recipients within an organization in view of the sender, and forwarding the message to a recipient selected from the list of the candidate recipient to enable the selected recipient to handle the message.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

Techniques for message forwarding based on a relationship between a sender and a recipient are described herein. In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

Accordingly, certain techniques are introduced to process an incoming call or message in view of information provided by an enterprise information system (EIS) such as enterprise resource planning (ERP) associated with an enterprise entity or organization, including generating a proper context associated with the caller or sender, identifying a proper user or recipient to handle the incoming call or message, and providing suggestions or predicting certain further actions that may be performed.

According to certain embodiments, a call routing controller, which is an incoming call routing management hub, is designed to automatically forward an incoming call to a right contact based on a duty management framework of an enterprise information system (EIS). It is a routing management with integrating duty management, organization structure, and/or customer support functions of the EIS. The routing management process here is based on and also beyond of those existed call routing methodology, which is based on Recipient Presence/user availability status.

Figure 1:
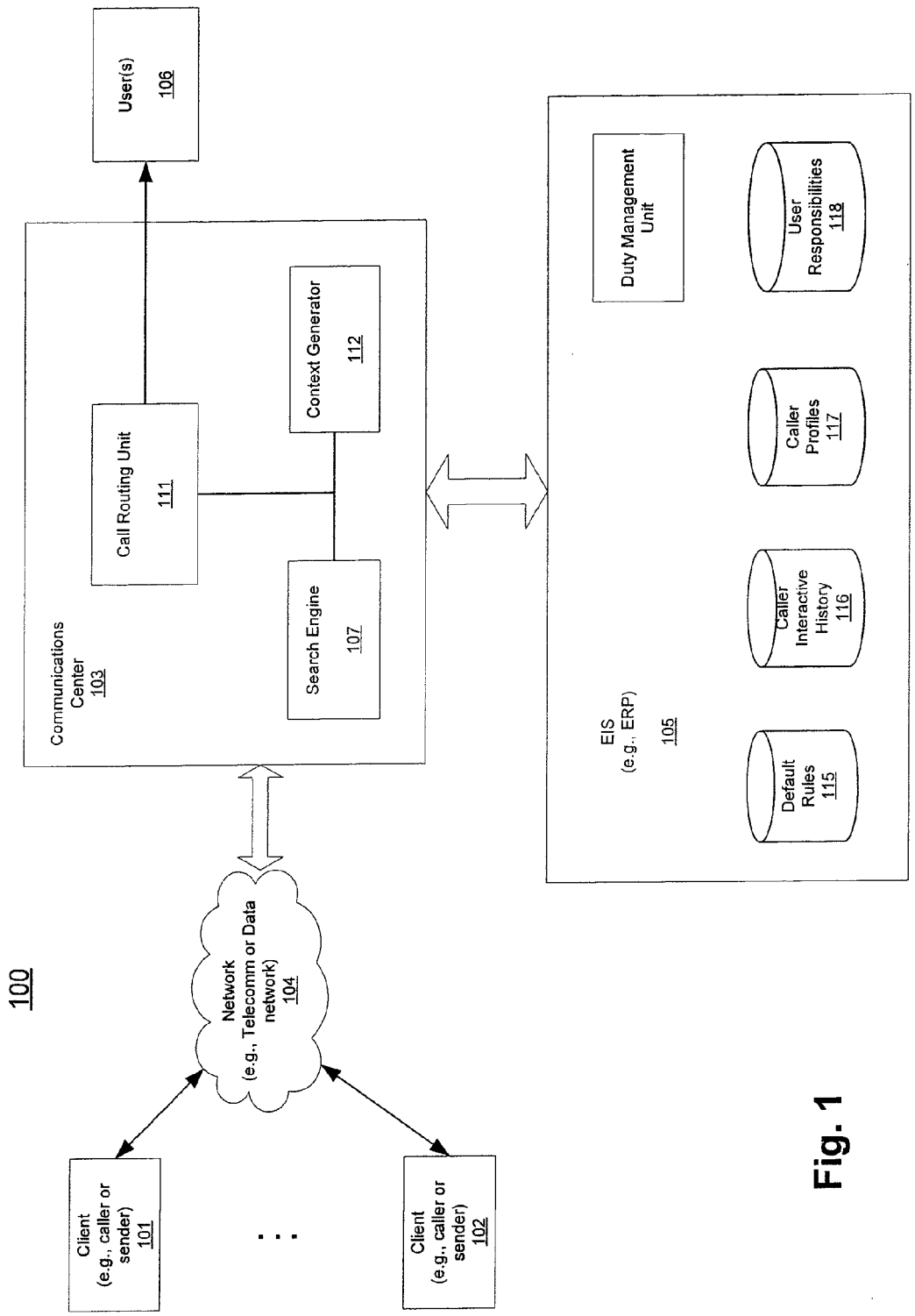
FIG. 1 is a block diagram illustrating a system configuration for routing a call based on duty management framework according to one embodiment.

FIG. 1 is a block diagram illustrating a system configuration for routing a call based on duty management framework according to one embodiment. In one embodiment, system 100 includes, but is not limited to, a search engine, in response to a message from a sender over a network, to identify a list of candidate recipients to handle the message based on roles of the candidate recipients within an organization in view of the sender, and a forwarding engine coupled to the search engine to forward the message to a recipient selected from the list of the candidate recipient to enable the selected recipient to handle the message.

Referring to FIG. 1, system 100 includes one or more clients 101-102 communicatively coupled to a server 103 over a network 104. For the purposes of illustration, clients 101-102 are callers communicatively coupled to a communication center 103 which may be a call center or enterprise IP-Telephony network associated with an organization or enterprise entity. For example, callers 101-102 may be customers of an enterprise entity owning and/or operating communication center 103. One or more users 106 may be employees or customer representatives of the enterprise entity. The users 106 may be receiving calls from callers 101-102 over a network 104, which may be a PSTN (public switch telephone network), a PBX or a data network (e.g., Internet using voice over IP or VoIP technologies).

In one embodiment, communication center 103 may be communicatively coupled to an enterprise information system (EIS) 105 associated with the enterprise entity. Referring back to FIG. 1, in one embodiment, server 103 may include a call routing controller or unit 111 coupled to a search engine 107, in response to an incoming call received from a caller (e.g., callers 101-102) over a network to identify a potential user 106 (e.g., a recipient) who handles the incoming call. In addition, communication center 103 further includes a context generator 112 to generate a communication context having information related to the call and/or certain related transactions, where the communication context may be forwarded to user 106 along with the call. As a result, user 106 has sufficient information regarding the caller (e.g., caller's identification and/or previous related transactions, etc.) when the call is routed and received by the user.

In one embodiment, in response to an incoming call, search engine 107 perform a search or searches within one or more databases (e.g., databases 115-118) for storing information regarding business transactions associated with the caller and/or potential users. For example, a search engine may search and identify one or more users that may be suitable for handling an incoming call of a particular caller based on certain factors associated with the caller and/or the users.

In one embodiment, a potential user that will receive a call may be identified based on information derived from an identity and access management (IAM) system of EIS 105. In a particular embodiment, a potential user may be identified via a duty management framework of an IAM system. For example, a user may be identified based on the responsibilities of the user within the enterprise entity provided and managed by the IAM.

For example, if a call is received from a customer located in an east region, a user who is responsible for that region may be identified and selected to handle the call. Further, as another example, if a call is received from a customer who has a particular type of product, a user who is in charge of providing services to that type of products may be identified and selected to handle such a call. User responsibilities may be predefined or assigned within the duty management system of the EIS and such information may be used to route a call to a proper user to answer.

Figure 2:
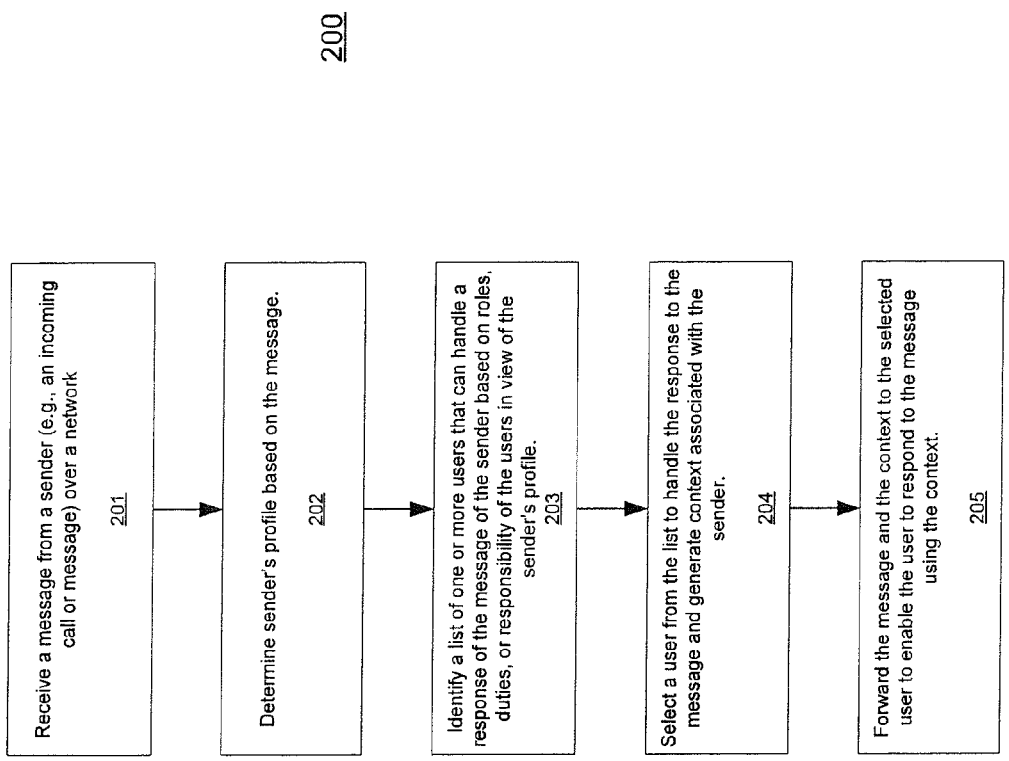
FIG. 2 is a flow diagram illustrating a process for routing a call to a proper user according to one embodiment of the invention.

FIG. 2 is a flow diagram illustrating a process for routing a call to a proper user according to one embodiment of the invention. Note that process 200 may be performed by processing logic which may include software, hardware, or a combination of both. For example, process 200 may be performed by system 100 of FIG. 1. In one embodiment, process 200 includes, but is not limited to, in response to a message from a sender over a network, identifying a list of candidate recipients to handle the message based on roles of the candidate recipients within an organization in view of the sender, and forwarding the message to a recipient selected from the list of the candidate recipient to enable the selected recipient to handle the message.

Referring to FIG. 2, at block 201, when a message or call is received from a caller over a network, processing logic determines sender's profile based on the message at block 202. At block 203, processing logic identifies a list of one or more users that can handle a response of the message of the sender based on roles, duties, or responsibilities of the users in view of the sender's profile. At block 204, processing logic selects a user form the list to handle the response to the message or call, and generates a context associated with the call or sender. At block 205, the message as well as the context is forwarded to the user to respond to the message using the context.

In a particular embodiment, when a customer's incoming call is received (e.g., customer located in the east region), the customer's caller ID (phone number, SIP (Session Initiation Protocol) address if the call is made by an IP phone) is extracted based on an address book or contract directory. Responsible persons are searched according to responsibility matrix and/or duty management framework to identify the users based on the caller's profile. If there is only one user found, then the call is forwarded to the user. Then the call connected with the identified user profile appears at the user's computer user interface.

If there is more than one user found, a search is conducted in a caller communication interactive history database and a user is selected according to default rules (e.g. rules to select the most frequent contact, rules to select the latest contact, or other default rules).

If the call fails to connect because no response is received from the user, then the call will be forwarded to the next user according to default rules. If there is still no user response the call is forwarded to a receptionist or a general number for manual transfer to the call or alternatively, the call is transferred to an upper grade, higher level contact, or a direct manager according to company responsibility structure or organization model.

Figure 3:
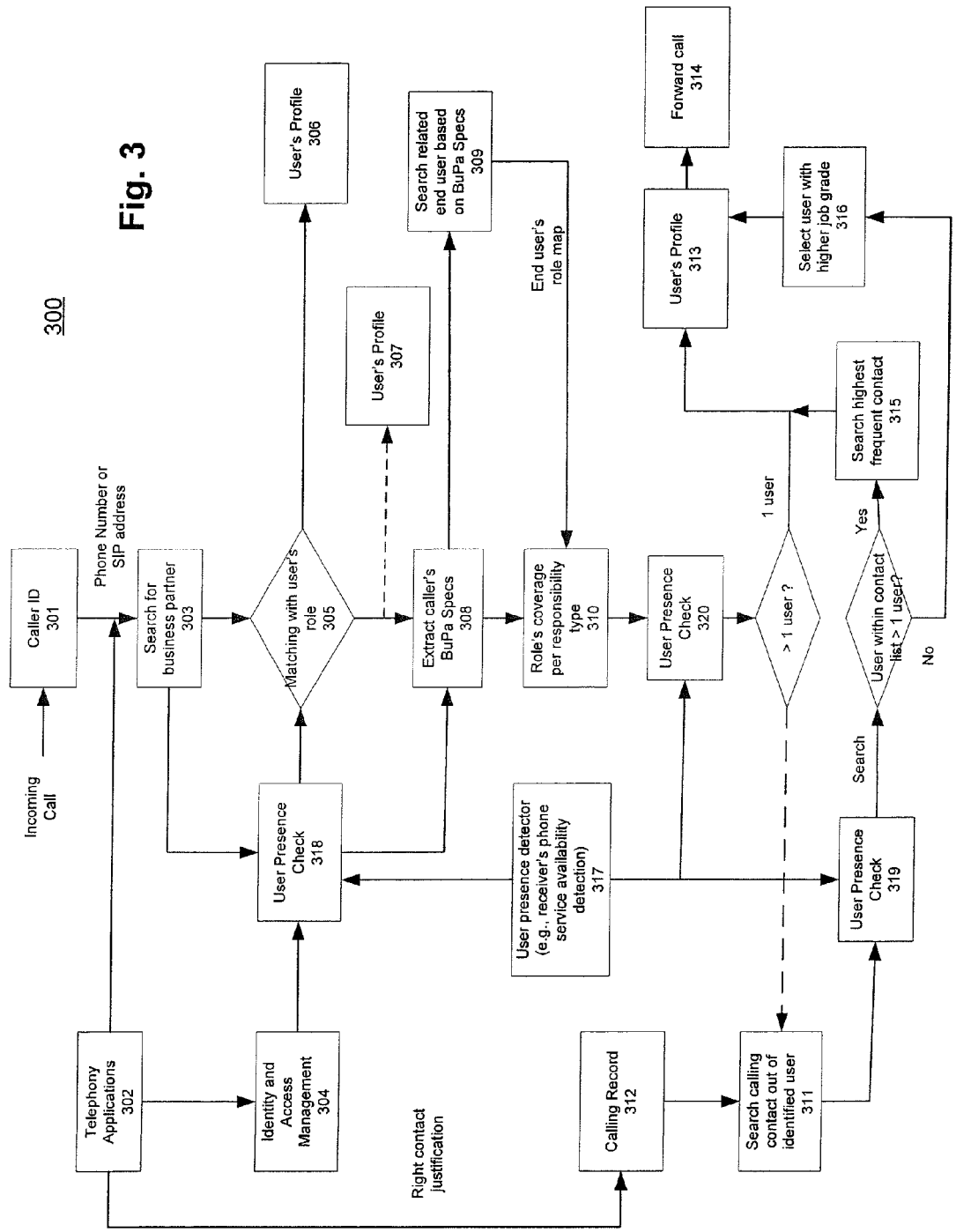
FIG. 3 is a flow diagram illustrating a process for routing a call based on information from EIS according to one embodiment of the invention.

FIG. 3 is a flow diagram illustrating a process for routing a call based on information from EIS according to one embodiment of the invention. Note that process 300 may be performed by processing logic which may include software, hardware, or a combination of both. For example, process 300 may be preformed by system 100 of FIG. 1.

Referring to FIG. 3, when an incoming call is received, at block 301, the caller's identity, such as, for example, caller ID or SIP address if it is an IP phone is extracted. In one embodiment, such a caller's identity is extracted via a telephony application 302. Based on caller's identity, at block 303, a search is conducted to determine a type of business partnership of the caller with respect to the enterprise entity, such as, for example, whether the caller is a customer, supplier, or agent of the enterprise entity.

In addition, based on caller's identity, at block 304, a user role or roles may be identified to handle the call, for example, via IAM (Identity and Access Management) framework of the EIS as described above. For example, if the call is received from an east region, one or more users that are responsible for the east region may be identified. At block 305, the identified user roles are matched with the types of business partnership identified at block 303. If there a user matched, at block 306, the call is forwarded to the identified user and the user's profile is opened to the identified user for handling the call. Otherwise, at block 307, the user's profile will be frozen (e.g., not to be viewed by any user at this point).

If there is no user matched, at block 308, caller's business partner specification is extracted as a result of operations performed at block 303. An example of a business partner specification includes, but is not limited to, a type of business partner, region, phone number, email address, and/or other contact information. At block 309, a search is performed to identify any end users that may be related to the caller based on the business partner specification of the caller. In one embodiment, such a search is performed via identity and access management of the EIS. As a result of the search, at block 310, a list of responsible person per coverage rate is generated.

If the list contains only one user, at block 313, a user's profile information associated with the identified user is generated and at block 314, the call and the user's profile information are forwarded to the user. If the list includes more than one user, at block 311, a search is performed based on calling records 312 to identify any users that have been contacted by the caller previously. If there is at least one user that has been contacted before, at block 315, a user having highest frequent contacts may be selected. If there is no user that has been contacted before, at block 316, a user having a higher or highest job grade is selected. Thereafter, a user profile is generated at block 313 and the call as well as the user's profile is forwarded to the selected user at block 314.

In addition, according to certain embodiments, user presence check operations 318-320 are performed to ensure the receiver's phone services are available at the time. User presence check operations 318-320 may be controlled or operated by user presence detector 317 (also referred to as receiver's phone service availability detection). The user presence detector 317 is configured to centrally detect phone service availability status for user presence check units 318-320. Other operations may also be performed.

Figure 4:
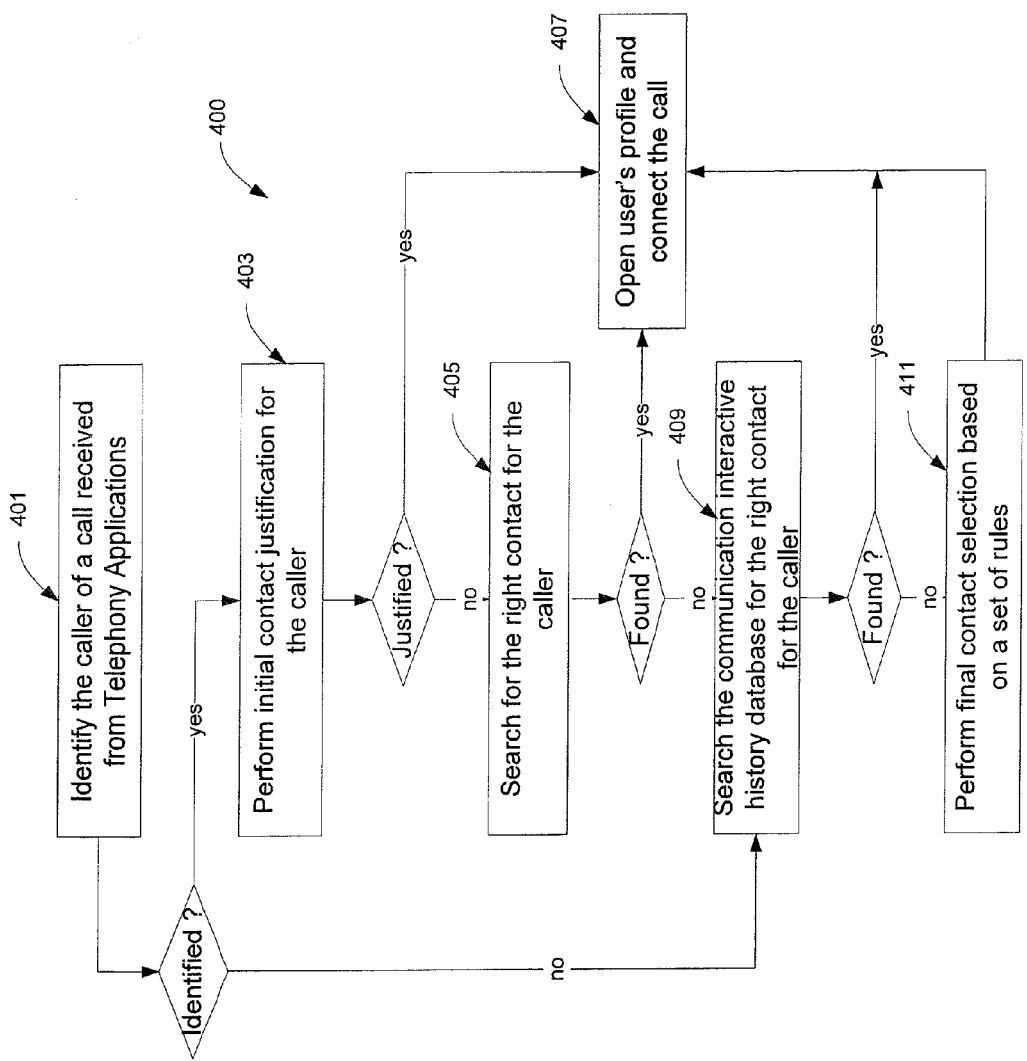
FIG. 4 is a flow diagram illustrating an overview process for routing a call to a proper user according to one embodiment of the invention.

FIG. 4 is a flow diagram illustrating an overview process for routing a call to a proper contact according to one embodiment of the invention. On receiving a call, according to one embodiment, the processing logic determines the identity of the caller at block 401. The call may be placed through a telephony application by a business partner, such as a supplier or a customer, of the associated enterprise entity receiving the call. The caller may be identified by matching the call with a communication interactive history database associated with the caller previously registered in the EIS of the enterprise entity. The calling identify of a call may be a phone number, a name in association with a business, a person's name or simply a registered id in the EIS. If the caller is not identified, the processing logic may search a calling record—from communication interactive history database at block 409.

In one embodiment, the processing logic performs initial justification check against an identified caller with the target contact at block 403. Typically, the target contact may be determined based on the target phone number associated with the call. In one embodiment, the contact is justified for the call based on the IAM system of the EIS. The IAM system may verify a match between the identity of the caller and the access right of the contact. When a contact is justified, the processing logic may proceed to open a user's profile information of the caller for the contact to connect the call at block 407. The user's profile information may be associated with the registered business record for the identified caller.

In one embodiment, if the caller and the target contact fail to be justified at block 403, the processing logic proceeds to search for the right contact at block 405. A right contact may be justified with the corresponding caller based on the IAM system of the EIS. In one embodiment, the processing logic searches all contacts related to the caller's identity within the EIS. The processing logic may determine a group of contacts who have a predetermined access right to the business information associated with the caller for receiving the call. If a single contact is found, according to one embodiment, the processing logic proceeds to block 407 and connects the call. If the processing logic finds more than one contacts or cannot find any contact for the call at block 405, according to one embodiment, the processing logic searches the calling history related to the caller to determine a right contact at block 409. Otherwise, the processing logic may connect the call to the contact determined according to the calling history at block 407. In one embodiment, if the right contact cannot be found based on the calling history, the processing logic performs a final contact selection based on a set of predetermined rules at block 411. The set of predetermined rules may guarantee at least one contact will be available to receive the call.

Figure 5:
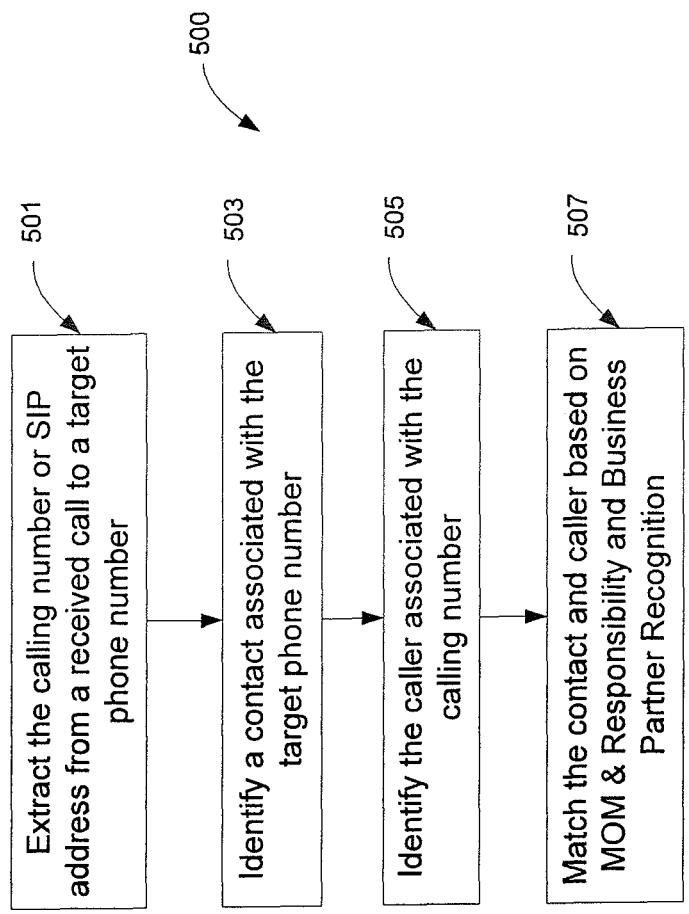
FIG. 5 is a flow diagram illustrating an initial justification process for routing a call to a proper contact according to one embodiment of the invention.

FIG. 5 is a flow diagram illustrating an initial justification process for routing a call to a proper contact according to one embodiment of the invention. Process 500 may perform similar functions as in block 403 of FIG. 4. In one embodiment, the processing logic extracts a calling number or an SIP address from an incoming call at block 501. The call may be placed through an Telephony application directed to a target phone number associated with an enterprise entity. At block 503, in one embodiment, the processing logic identifies a contact within the enterprise entity according to the target phone number of the call. Each contact may be specified in the EIS of the enterprise entity with certain access rights to information related to business partners, such as master data of organizational model & responsibility settings in an identity and access management system. For example, a certain contact may have access right only to those business partners in the eastern region of the states and/or only to supplier related business information of a business partner.

At block 505, according to one embodiment, the processing logic proceeds to identify the caller according to the calling number or the SIP address obtained at block 501. The processing logic may invoke an identity assessment management function of the EIS to retrieve a user's profile associated with the caller. A user's profile information may include business related information about a business partner, such as the business name, the owner's name, and the associated business relationship as a customer or a supplier, etc. In one embodiment, a user's profile is specified in Business Partner Recognition settings. In one embodiment, the processing logic matches both the identified caller and contact based on the IAM system in the EIS at block 507. The match may be successful if the contact has access right with respect to the business information related to the caller according to settings in MOM & Responsibility and Business Partner Recognition in the EIS. In one embodiment, the match at block 507 fails if the processing logic cannot identify either the caller or the contact.

Figure 6:
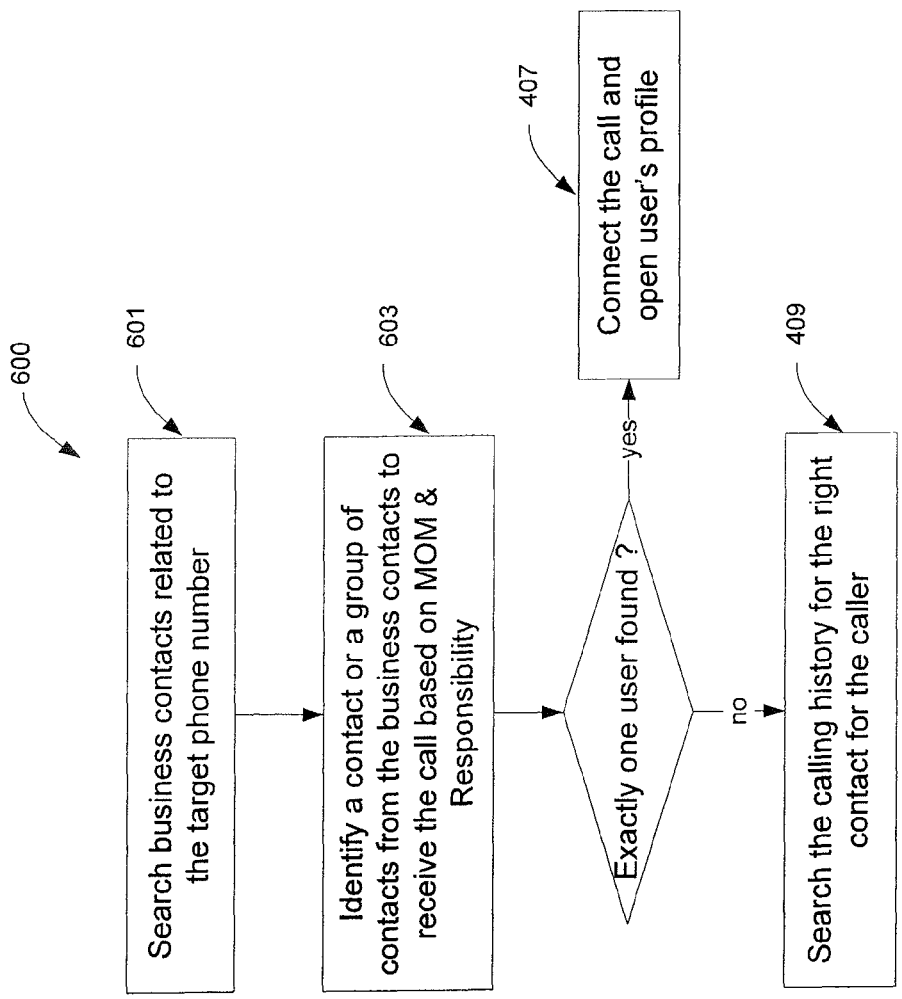
FIG. 6 is a flow diagram illustrating a contact search process for routing a call to a proper contact according to one embodiment of the invention.

FIG. 6 is a flow diagram illustrating a contact search process for routing a call to a proper contact according to one embodiment of the invention. The process 600 may perform similar functions as in block 405 of FIG. 4. In one embodiment, the processing logic searches the EIS for business contacts related to the target phone number associated with the call at block 601. A phone number in an enterprise entity may be associated with one or more contacts. For example, more than one customer service representatives in a call center may be related to a phone number assigned to the call center. In one embodiment, the processing logic performs a search at block 601 based on the SIP address of the received call instead of a phone number. At block 603, according to one embodiment, the processing logic identifies a subset of contacts who have right to access the user's profile information of the caller from among those business contacts found at block 601. The identification may be based on an IAM system in the EIS, such as settings in MOM & Responsibility for access management. In one embodiment, the identification may include checking a business presence status of a contact based on the EIS to determine if the contact is currently available to receive any call which is already a normal function as incoming call routing methodology, In one embodiment, if the processing logic finds only one available contact with access right matching the caller at block 603, the processing logic proceeds to connect the contact with the caller at block 407. Otherwise, according to one embodiment, the processing logic performs a search as in block 409 of FIG. 4 if more than one available contact is found or no contact is identified at block 603.

Figure 7:
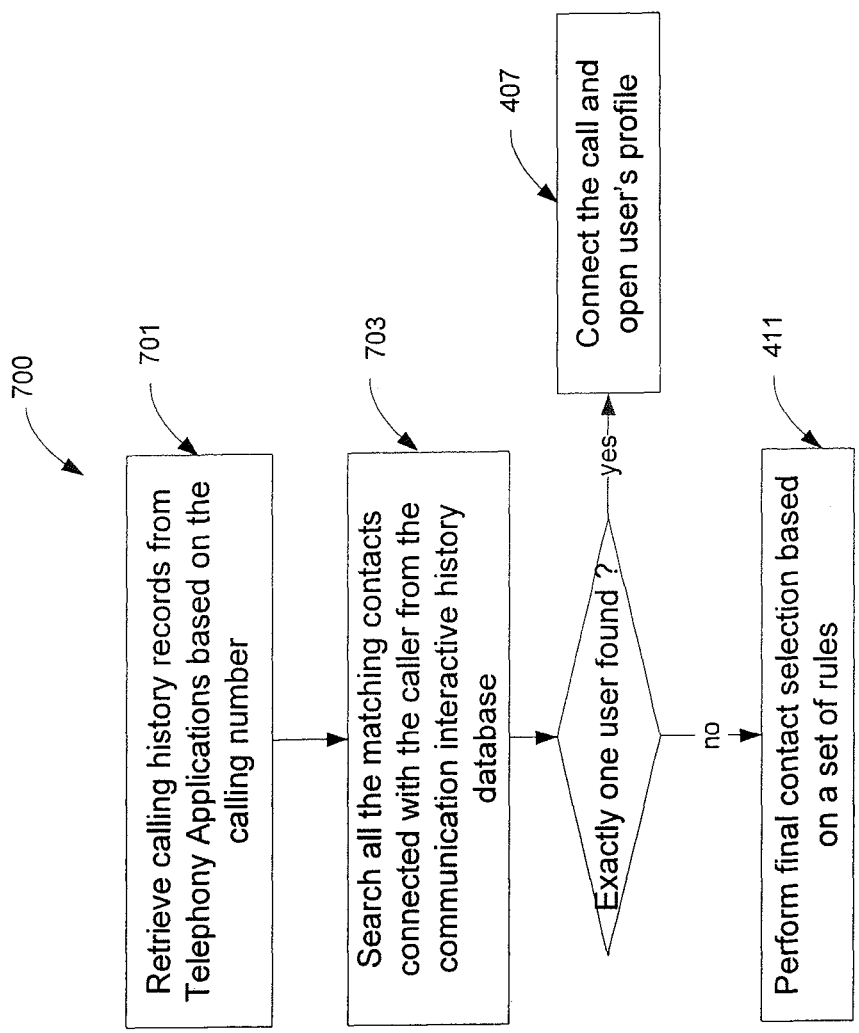
FIG. 7 is a flow diagram illustrating a calling history search process for routing a call to a proper user according to one embodiment of the invention.

FIG. 7 is a flow diagram illustrating a calling history search process for routing a call to a proper user according to one embodiment of the invention. The process 700 may perform similar functions as in block 409 of FIG. 4. In one embodiment, the processing logic retrieves a calling history associated with the phone number or the SIP address of the call received at block 701. The processing logic may send a request to a Telephony Application which forwards the call to retrieve the calling history. A calling history may include more than one calling records in association with the call. The caller or the callee in a retrieved calling record may be associated with the call based on the phone number or the SIP address. A calling record may include the initiation time and/or duration of the corresponding call.

In one embodiment, the processing logic searches the retrieved calling history to identify available contacts in the enterprise entity in association with at least one calling record from the -communication interactive history database at block 703. If only one matching contact is found at block 703, the processing logic may proceed to connect the caller with the matched single contact at block 407 of FIG. 4. A contact may be matched if the contact is associated with at least one calling record in the -communication interactive history database, the contact has access right to the user's profile of the caller based on the EIS, and/or the contact is currently available according to business presence of the EIS to receive a call. If more than one contact is matched or none is matched at block 703, according to one embodiment, the processing logic continues at block 411 to perform final contact selection.

Figure 8:
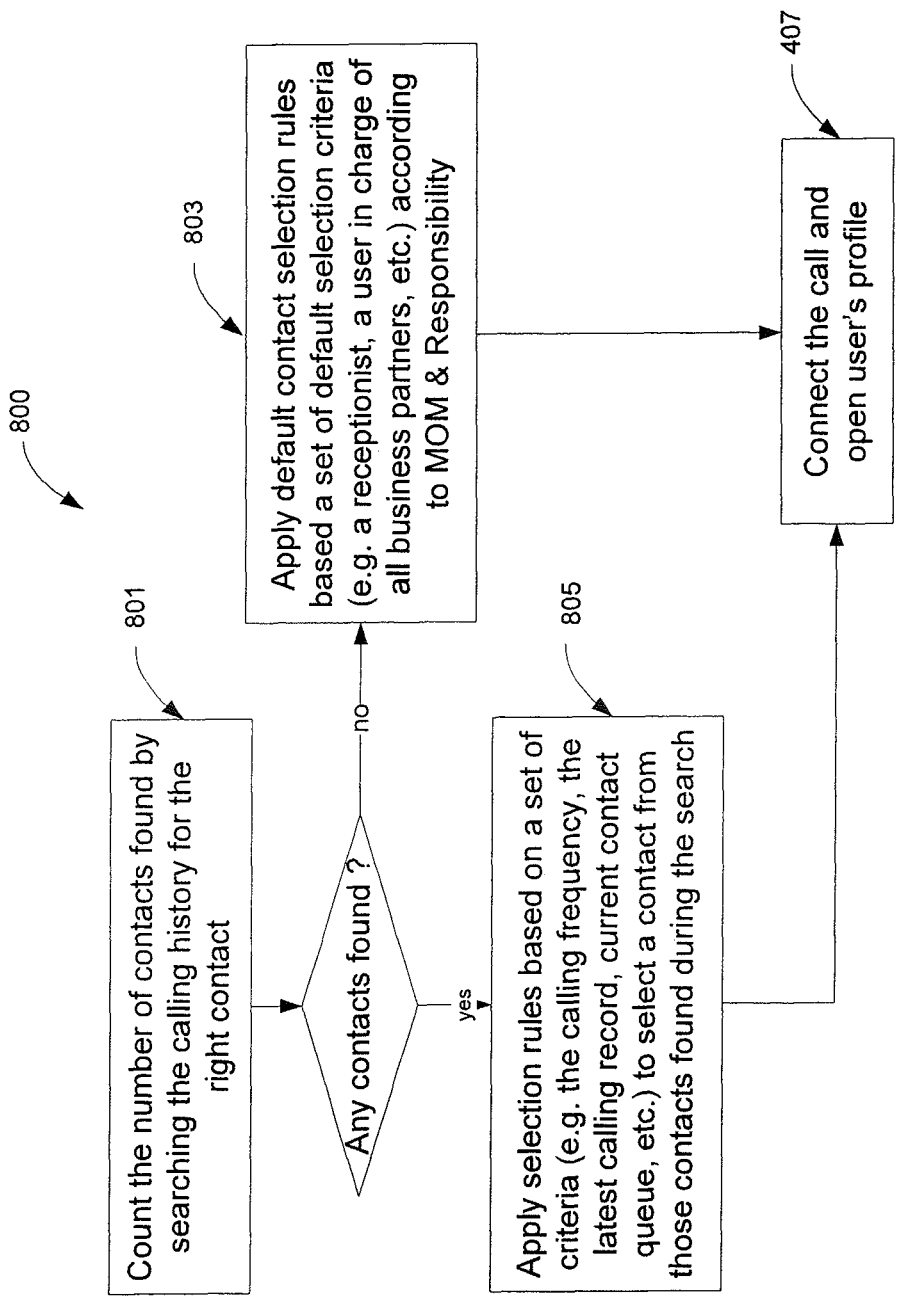
FIG. 8 is a flow diagram illustrating a final selection process for routing a call to a proper contact according to one embodiment of the invention.

FIG. 8 is a flow diagram illustrating a final selection process for routing a call to a proper contact according to one embodiment of the invention. The process 800 may perform functions similar to those in block 411 of FIG. 4. In one embodiment, the processing logic counts the number of matched contacts according to the search at block 703 of FIG. 7. In one embodiment, the number may be greater than one. In another embodiment, the number may be zero, such as when no contact is identified. If there are more than one contacts identified, the processing logic may select one contact from among the identified contacts at block 805. In one embodiment, the selection may be based on a set of criteria within predefined rules in the EIS. The criteria associated with a contact may include the frequency of making/receiving calls between the caller and the contact based on the calling history, the last time the call between the caller and the contact was made, or parameters of the current service queue associated with the contact, such as the number of calls answered for the day, the number of calls waiting to be answered, and/or the length of time since completing the last call. In one embodiment, the predefined set of rules includes selecting the contact with the highest frequency of making/receiving calls between the contact and the caller. In another embodiment, the predefined set of rules includes selecting the contact having the most recent call with the caller. One of the redefine rules may determine the contact associated with the shortest current call waiting queue. At block 407 of FIG. 4, in one embodiment, the processing logic connects the caller with the contact selected at block 805.

In one embodiment, the processing logic selects a contact to receive the call according to a set of default selection rules at block 803, if no contact is found during the search at block 703 of FIG. 3. In one embodiment, the processing logic fails to find any contact to receive the call at block 803 because the identity of the caller is missing in the EIS. In another embodiment, the processing logic fails to find any contact to receive the call at block 803 because of lack of matching between the access right of a contact and the user's profile information of the caller. In one embodiment, the set of default selection rules are based on default selection criteria such as business roles associated with a contact. A business role may be related to the position associated with a contact within the enterprise entity, such as a receptionist or a manager, etc. according to MOM & Responsibility of IAM framework in the EIS. In one embodiment, the default selection rules include assigning a receptionist as the contact to receive the call. In another embodiment, the default selection rules include assigning a manager in charge of all business partner service to receive the call. At block 407 of FIG. 4, in one embodiment, the processing logic connects the caller with the contact selected at block 803.

Figure 9:
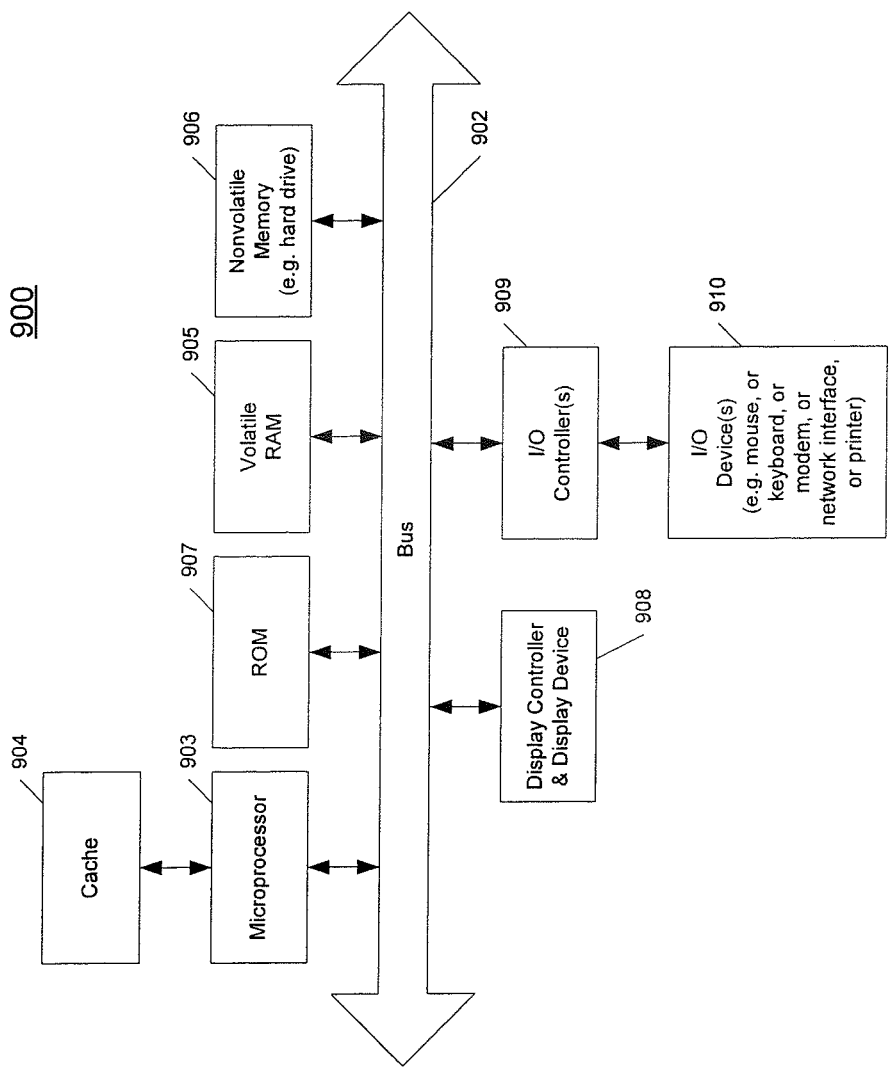
FIG. 9 is a block diagram of a digital processing system, which may be used with one embodiment of the invention.

FIG. 9 is a block diagram of a digital processing system, which may be used with one embodiment of the invention. For example, the system 900 may be used as a client and/or a server as described above with respect to FIG. 1. Note that while FIG. 9 illustrates various components of a computer system, it is not intended to represent any particular architecture or manner of interconnecting the components; as such details are not germane to the present invention. It will also be appreciated that network computers, handheld computers, cell phones and other data processing systems which have fewer components or perhaps more components may also be used with the present invention.

As shown in FIG. 9, the system 900, which is a form of a data processing system, includes a bus or interconnect 902 which is coupled to one or more microprocessors 903 and a ROM 907, a volatile RAM 905, and a non-volatile memory 906. The microprocessor 903, which may be, for example, a PowerPC microprocessor or an Intel compatible processor, is coupled to cache memory 904 as shown in the example of FIG. 9. The bus 902 interconnects these various components together and also interconnects these components 903, 907, 905, and 906 to a display controller and display device 908, as well as to input/output (I/O) devices 910, which may be mice, keyboards, modems, network interfaces, printers, and other devices which are well-known in the art.

Typically, the input/output devices 910 are coupled to the system through input/output controllers 909. The volatile RAM 905 is typically implemented as dynamic RAM (DRAM) which requires power continuously in order to refresh or maintain the data in the memory. The non-volatile memory 906 is typically a magnetic hard drive, a magnetic optical drive, an optical drive, or a DVD RAM or other type of memory system which maintains data even after power is removed from the system. Typically, the non-volatile memory will also be a random access memory, although this is not required.

While FIG. 9 shows that the non-volatile memory is a local device coupled directly to the rest of the components in the data processing system, the present invention may utilize a non-volatile memory which is remote from the system; such as, a network storage device which is coupled to the data processing system through a network interface such as a modem or Ethernet interface. The bus 902 may include one or more buses connected to each other through various bridges, controllers, and/or adapters, as is well-known in the art. In one embodiment, the I/O controller 909 includes a USB (Universal Serial Bus) adapter for controlling USB peripherals. Alternatively, I/O controller 909 may include an IEEE-1394 adapter, also known as FireWire adapter, for controlling FireWire devices.

Overview of EIS and ERP Systems

An EIS, which may be used in embodiments of the invention described above, is generally any kind of computing system that is of "enterprise class". This means typically offering high quality of service, dealing with large volumes of data (e.g., capable of supporting some relatively large organization, also referred to as an "an enterprise").

EIS systems provide a technology platform that enables organizations to integrate and coordinate their business processes. They logically provide a single system that is central to the organization and ensure that information can be shared across all functional levels and management hierarchies. Enterprise systems are invaluable in eliminating the problem of information fragmentation caused by multiple information systems in an organization, by creating a standard data structure.

An EIS would typically be operated by professional system administrators and be deployed on a dedicated server or servers. It would typically offer network connectivity and provide services that supported the operations carried out by the enterprise. For example, an EIS may include an enterprise resource planning (ERP) system. ERP systems integrate (or attempt to integrate) most or all data and processes of an organization into a logically unified system. A typical ERP system uses multiple components of computer software and/or hardware to achieve the integration. A key ingredient of most ERP systems is the use of a logically single, unified database to store data for the various system modules, although the databases or data may be managed locally or remotely across a network or networks.

The term ERP originally implied systems designed to plan the utilization of enterprise-wide resources. Although the acronym ERP originated in the manufacturing environment, today's use of the term ERP systems has much broader scope. ERP systems typically attempt to cover all basic functions of an organization, regardless of the organization's business or charter. Business, non-profit organizations, non governmental organizations, governments, and other large entities utilize ERP systems.

Additionally, it may be noted that to be considered an ERP system, a package (which may include software, hardware, or a combination of both) generally would only need to provide functionality in a single package that would normally be covered by two or more systems. Technically, a package that provides both payroll and accounting functions would be considered an ERP package.

However, the term is typically reserved for larger, more broadly based applications. The introduction of an ERP system to replace two or more independent applications eliminates or reduces the need for external interfaces previously required between systems, and provides additional benefits that range from standardization and lower maintenance (one system instead of two or more) to easier and/or greater reporting capabilities (as all data is typically kept in one database logically).

Examples of modules in an ERP which formerly would have been stand-alone applications include, but are not limited to, manufacturing, supply chain, financial, CRM (customer relation management), human resources, and warehouse management, etc. ERPs are cross-functional and enterprise-wise. All departments involved in operations or production are integrated in one system (logically). In addition to manufacturing, warehousing, logistics, and information technology (IT), this would include accounting, human resources, marketing, and strategic management.

Best practices are also a benefit of implementing an ERP system. When implementing an ERP system, organizations essentially choose between customizing the software or modifying their business processes to the "best practice" functionality delivered in the vanilla version of the software. Best practice is considered by some a business buzzword used to describe the process of developing and following a standard way of doing things that multiple organizations can use for management, policy, and especially software systems.

MOM enterprise model contains all organizational structures of the extended enterprise, that is, all internal structures that are related to organizing the company itself and its collaborative partners, which are seamlessly integrated into the business processes. It also provides views on those organizational structures according to the requirements of the enterprise. The MOM enterprise structure is an instance of the MOM enterprise model in a particular company.

The main constituents of the MOM enterprise model are (i) structural units with their business characters, (ii) relationships forming hierarchies, (iii) positions, (iv) attributes and inheritance, (v) areas, (vi) responsibilities, (vii) templates and views and (viii) business constraints. All these entities and characteristics can be maintained time-dependently.

Figure 10:
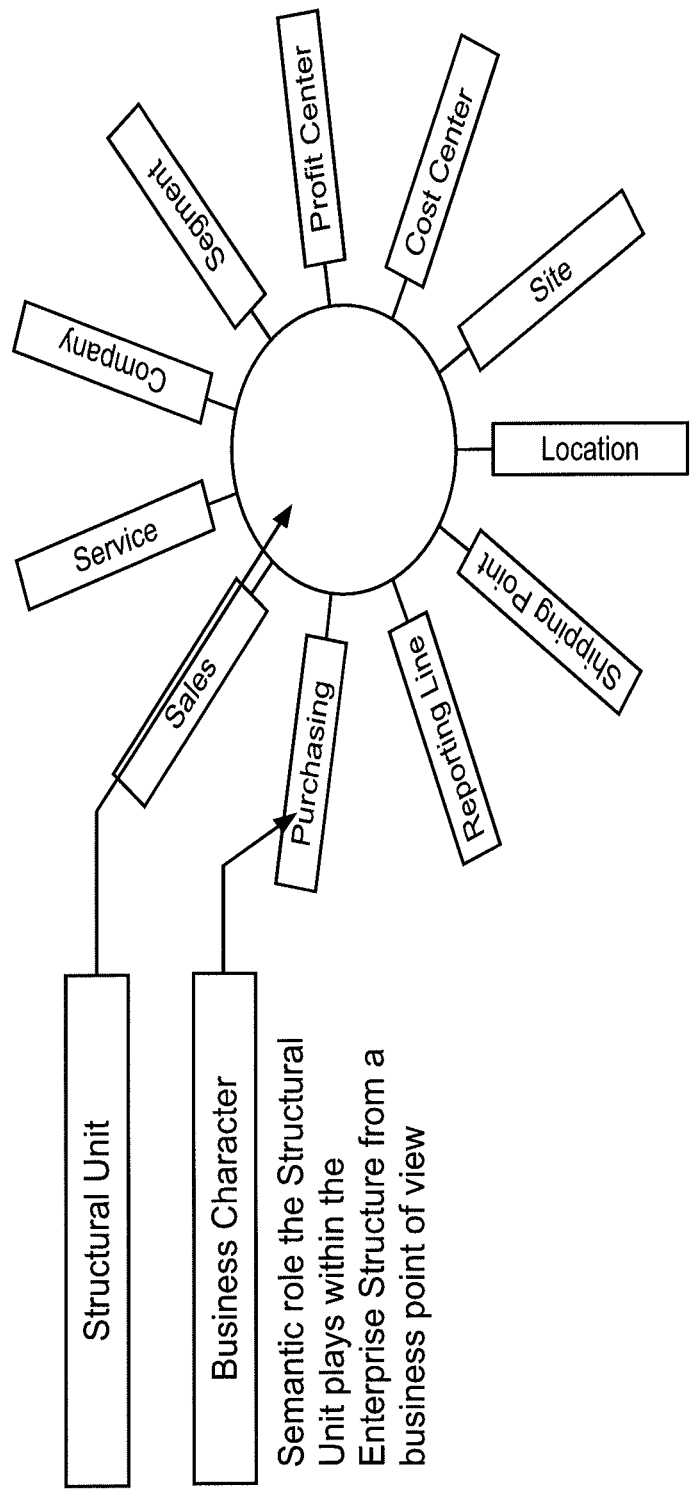
FIG. 10 is a diagram illustrating examples of Structural Units and Business Characters of an ERP system.

(i) Structural units, as shown in FIG. 10, are the basic building blocks of the MOM enterprise model. In a legal structure they represent the different legal entities, in money-related structures they are the nodes in a profit center or cost center hierarchy, in the reporting line structure they stand for divisions, departments, teams, etc.

Depending on what a structural unit represents in the company, it has certain business characters, for example "reporting line unit", "cost center", "profit center" or "location". We expect that a structural unit will often have more than one business character.

Figure 11:
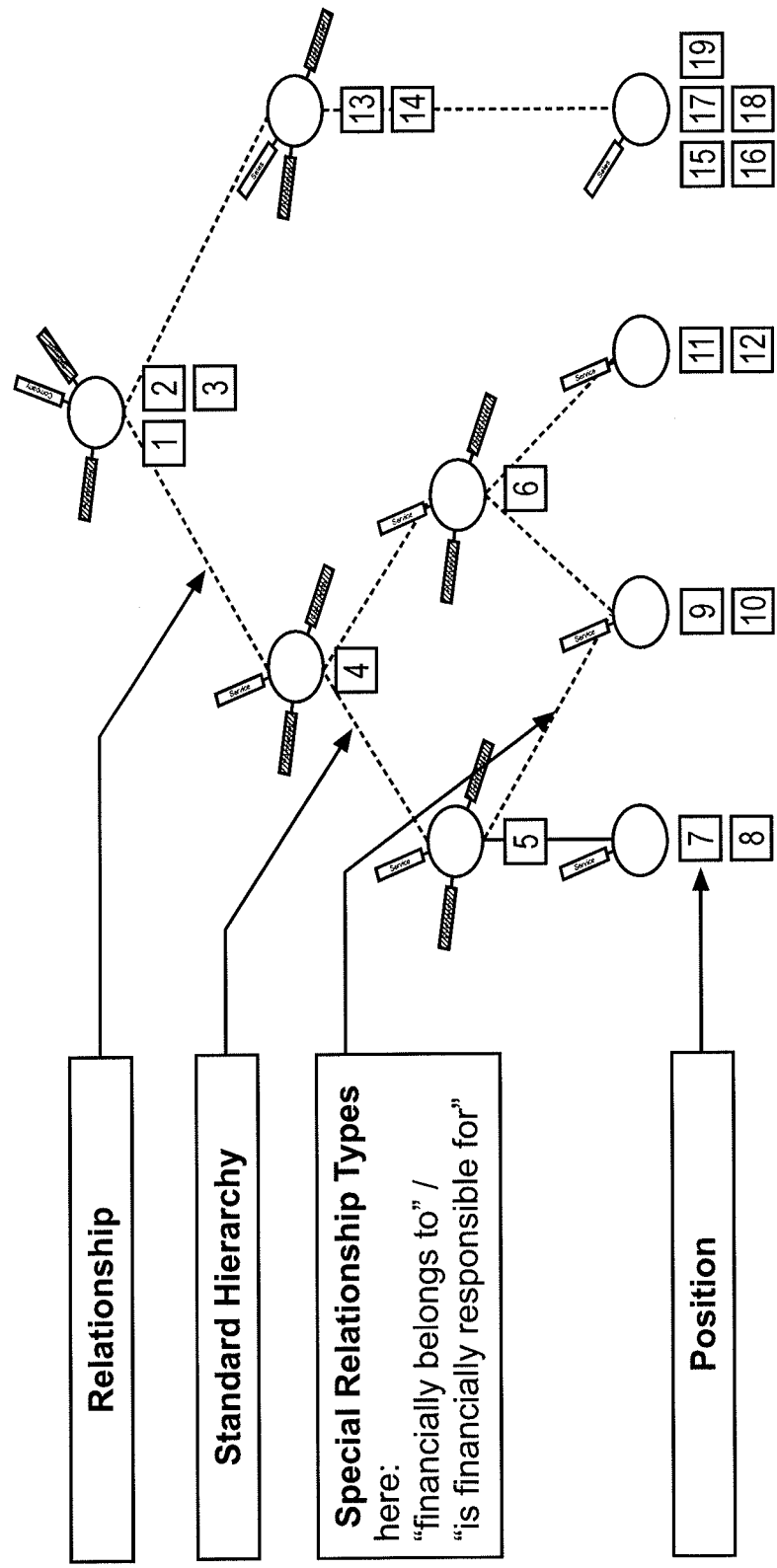
FIG. 11 is a diagram illustrating examples of Relationships, Hierarchies and Positions of an ERP system.

(ii) Structural units are linked through relationships of different types to form alternative hierarchies of an organizational structure as shown in FIG. 11. One standard relationship type forms the standard hierarchy of the company, while there are further specialized relationship types such as "legally belongs to", "financially belongs to" and "reports to". The key logic for all evaluations is to follow the standard relationship type unless there is a specialized relationship type maintained for the hierarchy relevant for the evaluation in question.

(iii) To be able to plan on structural units, persons are not directly connected to structural units. Instead positions representing planned or existing holders are linked to the structural units. This is done using different relationship types, for example, "works for" for the position where its holder works for a structural unit and "reports to" for the position where its holder reports to the manager of the structural unit. A holder represents a person that occupies a position.

(iv) Structural units and positions have attributes, which contain properties of the respective entities. Whether a particular attribute is allowed for a structural unit depends on the business character the structural unit has. There are other sets of attributes for positions and persons. Attributes can be inherited. For every attribute it is defined whether and how it is inherited and which relationship type is used for inheritance.

(v) Areas can be considered as groups of structural units used to group entities across hierarchical structures. The purchasing conditions and procedures, for instance, may be the same within a company group, although there are no direct hierarchical relations between the structural units.

(vi) Responsibilities describe the work that has to be done by a position or structural unit by means of the activity to be performed and the context for which the activity is performed. Typically the context contains objects such as structural units (for example, a foreman responsible for a purchasing team), products (for example, a sales team responsible for a certain product) and business partners (for example, a purchasing team responsible for a certain subset of all vendors).

(vii) When setting up the MOM enterprise structure, companies follow patterns. To support this, customers can define templates for typical structural units in their enterprise with a selection of assigned business characters and a list of default attribute values. Then, they can create structural units based on these templates.

Figure 12:
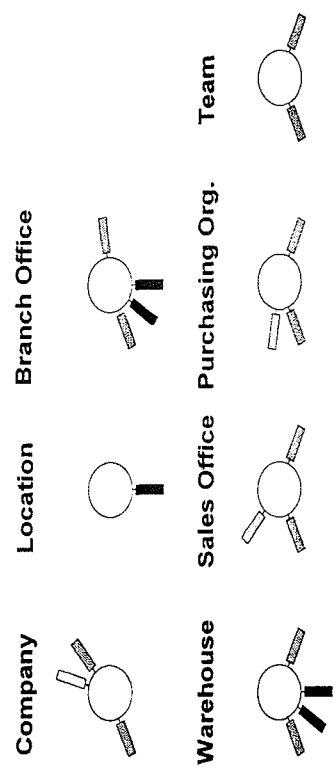
FIG. 12 is a diagram illustrating specific examples and templates of an ERP system.

As an example as shown in FIG. 12, a branch office could typically have the following business characters: profit center, reporting line unit, location and shipping point.

The maintenance of the enterprise structure is done with views. The views provide projections of the enterprise structure according to the requirements of the company and the user roles maintaining the enterprise structure.

(viii) Applications must be able to restrict what users are allowed to enter in the MOM enterprise model and what they are allowed to change. For this purpose, the MOM enterprise model contains the concept of business constraints, where each application can check if the changes in the enterprise structure are consistent and suit their business rules. Typical constraints could be rules stating that every cost center must be assigned to a legal entity, the deletion of objects already used is not allowed (for example, cost centers that are already used in accounting documents), or important attributes or relations cannot be changed in the past (for example, change of currency as of January 1 of last year).

Human resources is a good example of best practice as evidenced in most MOM systems. There are an infinite number of ways and a huge number of processes involved in managing an organization's employees, volunteers, and contractors. By choosing a "best practice" or standard way of organizing and performing processes, the makers of MOM systems or HRMS (human resource management system) software are able to produce systems that can be used by multiple organizations.

Often the benefit of best practice implementation in this context is that organizations who have poorly designed (or more likely evolved) processes are given a choice between an (typically) expensive modification to their system, or choosing to follow a Best Practice. The changing of best practice over time is a major force in ERP system lifecycles. Many major software releases have been prompted by the change or introduction of a best practice within an industry. The rate of enormous technological change over the past century forces rapid adaptation and versatile best practices.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

It is believed that processes taught by the discussion above may also be described in source level program code in various object-orientated or non-object-orientated computer programming languages (e.g., Java, C#, VB, Python, C, C++, J#, APL, Cobol, ABAP, Fortran, Pascal, Perl, etc.) supported by various software development frameworks (e.g., Microsoft Corporation's .NET, Mono, Java, Oracle Corporation's Fusion, etc.). The source level program code may be converted into an intermediate form of program code (such as Java byte code, Microsoft Intermediate Language, etc.) that is understandable to an abstract execution environment (e.g., a Java Virtual Machine, a Common Language Runtime, a high-level language virtual machine, an interpreter, etc.), or a more specific form of program code that is targeted for a specific processor.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these, quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description below. In addition, embodiments of the present invention are not described with reference to any particular programming language. It will be appreciated that a variety of programming languages may be used to implement the teachings of embodiments of the invention as described herein.

A machine-readable medium may include any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense

What is claimed is:

1. A method, comprising:
   determining, in response to a message from a sender over a network, a type of relationship between the sender and a recipient, wherein the determining the type is performed based on at least information obtained from an enterprise resource management system;
   identifying a role of the sender, wherein the role is identified based on a previous transaction associated with the sender and based on at least information obtained from the enterprise resource management system;
   determining whether a match exists between the determined type of relationship and the identified role;
   forwarding, to a first device associated with the recipient, the message including a profile of the sender, when the match exists;
   searching the enterprise resource management system with a search engine to identify a list of candidate recipients, when the match does not exists, wherein the searching queries for the list of candidate recipients are based on at least the determined type of relationship, and wherein the enterprise resource management system comprises at least one database including responsibilities associated with the list of candidate recipients, sender profiles, sender history, and one or more rules to facilitate matching the sender with a second device associated with the recipient selected from the list of candidate recipients; and
   forwarding the message to the second device to enable the selected recipient to handle the message, wherein the determining the type, the identifying, the determining whether, the forwarding, and the searching are performed by at least one processor.

2. The method of claim 1, further comprising determining a sender profile based on the message, wherein the candidate recipients are identified further based on the sender profile.

3. The method of claim 2, further comprising generating a context associated with the sender based on the sender profile, the context to be forwarded to the recipient along with the message.

4. The method of claim 3, further comprising determining the type of relationship between the sender and the candidate recipients based on one or more previous transactions between the sender and an organization and handled by the candidate recipients.

5. The method of claim 4, further comprising creating a role map representing roles of the candidate recipients in view of the relationship between the organization and sender information extracted from the sender profile, wherein the selected recipient is selected based on a priority represented by the role map.

6. The method of claim 5, further comprising identifying one or more responsible users from the candidate recipients based on responsibilities of the candidate recipients within the organization based on coverage of services of different regions.

7. The method of claim 6, further comprising selecting one or more users from the identified responsible users based on previous contacts with the sender, if there are more than one identified responsible users.

8. The method of claim 7, further comprising selecting a user as a final recipient from the identified responsible users having previous contact with the sender, wherein the selected user is a most frequent contact user with the sender.

9. The method of claim 7, further comprising selecting a user as a final recipient from the identified responsible users if there is no responsible users having previous contact with the sender, the final recipient having a highest rating on job performance.

10. A non-transitory machine-readable medium having instructions therein, which when executed by a machine, cause the machine to perform a method, the method comprising:
    determining, in response to a message from a sender over a network, a type of relationship between the sender and a recipient, wherein the determining the type is performed based on at least information obtained from an enterprise resource management system;
    identifying a role of the sender, wherein the role is identified based on a previous transaction associated with the sender and based on at least information obtained from the enterprise resource management system;
    determining whether a match exists between the determined type of relationship and the identified role;
    forwarding, to a first device associated with the recipient, the message including a profile of the sender, when the match exists;
    searching the enterprise resource management system with a search engine to identify a list of candidate recipients, when the match does not exists, wherein the searching queries for the list of candidate recipients are based on at least the determined type of relationship, and wherein the enterprise resource management system comprises at least one database including responsibilities associated with the list of candidate recipients, sender profiles, sender history, and one or more rules to facilitate matching the sender with a second device associated with the recipient selected from the list of candidate recipients; and forwarding the message to the second device to enable the selected recipient to handle the message.

11. The non-transitory machine-readable medium of claim 10, wherein the method further comprises determining a sender profile based on the message, wherein the candidate recipients are identified further based on the sender profile.

12. The non-transitory machine-readable medium of claim 11, wherein the method further comprises generating a context associated with the sender based on the sender profile, the context to be forwarded to the recipient along with the message.

13. The non-transitory machine-readable medium of claim 12, wherein the method further comprises determining the type of relationship between the sender and the candidate recipients based on one or more previous transactions between the sender and an organization and handled by the candidate recipients.

14. The non-transitory machine-readable medium of claim 13, wherein the method further comprises creating a role map representing roles of the candidate recipients in view of the relationship between the organization and sender information extracted from the sender profile, wherein the selected recipient is selected based on a priority represented by the role map.

15. The non-transitory machine-readable medium of claim 14, wherein the method further comprises identifying one or more responsible users from the candidate recipients based on responsibilities of the candidate recipients within the organization based on coverage of services of different regions.

16. The non-transitory machine-readable medium of claim 15, wherein the method further comprises selecting one or more users from the identified responsible users based on previous contacts with the sender, if there are more than one identified responsible users.

17. The non-transitory machine-readable medium of claim 16, wherein the method further comprises selecting a user as a final recipient from the identified responsible users having previous contact with the sender, wherein the selected user is a most frequent contact user with the sender.

18. The non-transitory machine-readable medium of claim 17, wherein the method further comprises selecting a user as a final recipient from the identified responsible users if there is no responsible users having previous contact with the sender, the final recipient having a highest rating on job performance.

19. A system, comprising:
at least one processor; and
at least one memory including code which when executed by the at least one processor provides operations comprising:
determining, in response to a message from a sender over a network, a type of relationship between the sender and a recipient, wherein the determining the type is performed based on at least information obtained from an enterprise resource management system;
identifying a role of the sender, wherein the role is identified based on a previous transaction associated with the sender and based on at least information obtained from the enterprise resource management system;
determining whether a match exists between the determined type of relationship and the identified role;
forwarding, to a first device associated with the recipient, the message including a profile of the sender, when the match exists;
searching the enterprise resource management system with a search engine to identify a list of candidate recipients, when the match does not exists, wherein the searching queries for the list of candidate recipients are based on at least the determined type of relationship, and wherein the enterprise resource management system comprises at least one database including responsibilities associated with the list of candidate recipients, sender profiles, sender history, and one or more rules to facilitate matching the sender with a second device associated with the recipient selected from the list of candidate recipients; and
forwarding the message to the second device to enable the selected recipient to handle the message.

20. The system of claim 19, further comprising a sender oriented database coupled to the search engine, wherein the search engine is configured to access the sender oriented database to determine a sender profile based on the message, wherein the candidate recipients are identified further based on the sender profile.

* * * * *